Patented July 30, 1935

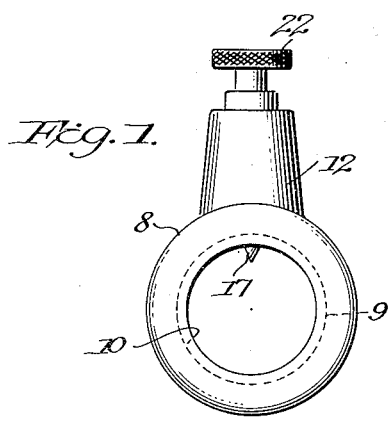
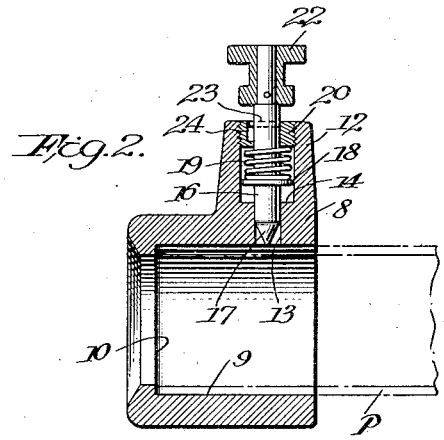
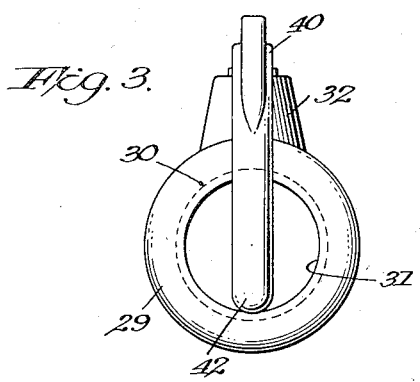
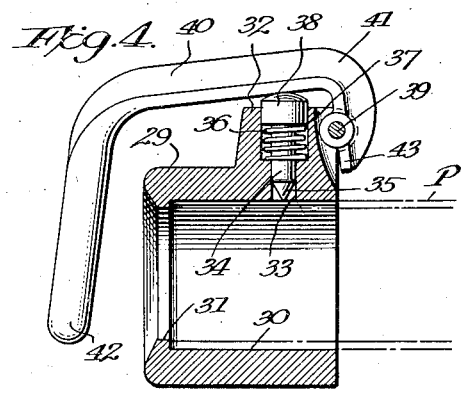
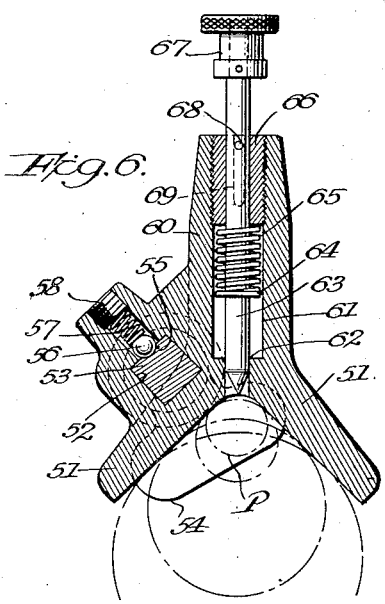
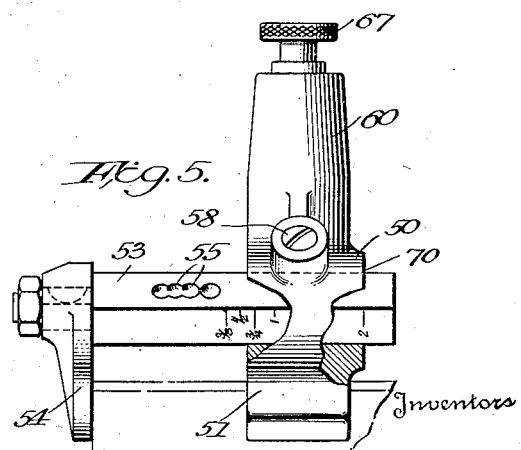

2,009,671

UNITED STATES PATENT OFFICE 2,009,671

SCRIBING TOOL

Robert H. Mueller and Ward M. Robinson, Decatur, Ill., assignors to Mueller Co., Decatur, Ill., a corporation of Illinois Application June 2, 1933, Serial No. 674,117

5 Claims. (Cl. 33—21)

The present invention relates to scribing tools and, more particularly, to scribing tools for use in marking piping. It will be understood, however, that the tools of our invention may be used for scribing or marking materials other than piping.

In plumbing or similar operations, pipe fittings or joints which permit the pipe fitting to be sealed to a section or length of pipe by the use of heat externally applied to the pipe fitting are frequently used. The bore of a pipe fitting of this type is usually provided with a circumferentially extending recess or recesses in which solder or a similar fusible bonding material is inserted during the manufacture of the fitting. The bore of the fitting is also provided with a shoulder positioned inwardly of the solder. When a pipe is to be connected to the fitting, the pipe is inserted in the bore of the fitting, positioned against the shoulder, and heat is then applied to the exterior of the fitting to melt the solder in the recess so that the solder will, when it again becomes hard, form a seal between the pipe fitting and the inserted end of the pipe.

In providing fittings of this type, the bore thereof is intended to have a close fit about the inserted pipe so that the melted solder will flow, by capillary attraction, between the wall of the bore of the pipe fitting and the exterior of the pipe. Because of the tight fit between the wall of the pipe and the bore of the pipe fitting, plumbers frequently fail to insert the pipe in the bore of the pipe fitting a sufficient distance to have the end of the pipe in contact with the internal shoulder of the pipe fitting. This naturally reduces the length of the pipe within the fitting and gives a seal over a smaller area than is desirable.

The principal object of the present invention is to provide a device which may be used to mark the pipe to be positioned in a pipe fitting of the type described above so that the depth to which the pipe must be inserted in the fitting will be indicated directly on the pipe.

A still further object of the invention is to provide a scribing tool which will be adjustable for operation upon pipes of various diameters and which will be adjustable for marking pipe at points spaced varying distances from the end of the pipe.

A further object of the invention is to provide a device of this type which may be operated to mark the pipe only at the point desired.

Still another object of the invention is to provide a scribing tool which will be highly accurate and which can be readily assembled and economically manufactured.

In its preferred form, the device of our invention comprises a scribing tool including a body portion and a scribing element. The length of piping to be marked is intended to be positioned against an abutment on the scribing tool and either the pipe or the scribing tool moved, one with respect to the other, so that a mark or marks will be described upon the pipe at a point spaced from the end of the pipe a distance corresponding to the distance between the terminal of the pipe fitting and the internal shoulder thereof against which the end of the pipe is intended to be subsequently positioned.

It will be understood that although the invention is particularly described as used with piping, it may be used for marking rods as well as a wide variety of other articles and regardless of the purpose of the marking.

Other objects and advantages of the invention will be apparent from the following specification and drawing, wherein like numerals refer to like parts throughout the several views.

Figure 1 is an end view of a scribing tool of our invention;

Figure 2 is a longitudinal sectional view through the device of Figure 1;

Figure 3 is an end view of another form of our device;

Figure 4 is a longitudinal sectional view through the tool of Figure 3;

Figure 5 is a side view, partly in section, of still another form of our device; and Figure 6 is a transverse sectional view through the device of Figure 5.

Referring to Figures 1 and 2, the numeral 8 designates the body portion of the tool which is preferably sleeve-like in shape, its bore 9 being provided, preferably at one end thereof, with an internally projecting abutment or shoulder 10. An outwardly and radially projecting boss 12 is provided upon the body 8 at a point spaced from the internal shoulder 10. The boss 12 has a bore 13 extending radially therethrough and through the wall of the body portion 8, the bore being countersunk as shown at 14 in Figure 2, and the extreme outer end of the countersunk portion being threaded.

A scribing element or pin 16 having a hard point 17 at its inner end is fitted in the bore 13. The scribing pin 16 is provided with an annular shoulder 18 and a coil spring 19 encircles the pin rearwardly of the shoulder with its inner end bearing upon the outer surface of the shoulder and its outer end bearing against an apertured collar 20 threaded in the outer end of the bore 13. The outer end of the pin 16 extends through the aperture in the collar 20 and a head or thumbpiece 22 is fixed to the pin 16 exteriorly of the collar. The scribing pin 16 is provided with a transverse pin 23 of relatively small diameter which is adapted to move in an axially extending slot or keyway 24 in the aperture of the collar 20, as shown in Figure 2. It will be noted that the slot 24 opens to the upper face of the collar 20 so that the pin 23 may be moved up and out of the slot. The lower end of the slot terminates above the lower face of the collar 20.

The spring 19 normally holds the scribing pin 16 inwardly with respect to the body 8 but the scribing pin may be moved outwardly with respect to the body by means of its head 22. After pulling the scribing pin 16 outwardly a sufficient distance to move the transverse pin 23 out of the slot 24, the scribing pin may be turned to move the transverse pin 23 out of alignment with the slot so that the point 17 of the pin 16 will not extend into the bore 9 of the body of the tool.

The provision of the pin 23 in the scribing pin 16 and the slot 24 in the collar 20 permits the pin and collar to be readily assembled in the body 8 and also removed therefrom, due to the fact that rotation of the scribing pin, with the pin 23 engaged in the slot 24, will cause rotation of the collar 20 in the counterbore 14.

In the use of the device shown in Figures 1 and 2, the pipe P to be inserted in a pipe fitting is positioned in the body 8 of our device with the end of the pipe contacting with the internal shoulder 10. It will be understood that the diameter of the bore 9 is such that it will snugly receive the pipe to be marked therein. The scribing pin 16 is moved outwardly, as described above, so that its point 17 will be out of contact with the surface of the pipe during the insertion of the pipe in the body 8. After the pipe has been inserted, the pin 16 is then released so that its point 17 will be pressed against the surface of the pipe by the spring 19 and the body 8 is then rotated upon the pipe or the pipe is rotated within the body. In either event, an annular mark will be formed upon the exterior surface of the pipe.

The point 17 of the scribing pin 16 is spaced from the internal shoulder 10 a distance corresponding to the depth to which the pipe must be inserted in a pipe fitting or joint to contact with the internal shoulder of the latter.

The form of our invention shown in Figures 3 and 4 comprises a sleeve-like body 29 including a bore 30 provided with an internally projecting abutment or shoulder 31 at one end thereof. A radially and outwardly extending boss 32 is provided upon the body 29 at a point spaced from the internal shoulder 31, the boss 32 having a bore 33 therethrough. A scribing element or pin 34 is fitted in the bore 33, the pin 34 being provided with a hardened point 35 at its inner end. A coil spring 36 seated in a counterbore 37 of the bore 33 encircles the pin 34, the inner end of the spring bearing against the shoulder of the counterbore and the outer end of the spring bearing against the shouldered head 38 provided at the outer end of the pin.

The boss 32 is provided with a tangentially or transversely extending pivot pin 39 upon which is mounted a handle 40. The handle 40 preferably extends upwardly from its point of pivotal attachment to the pivot pin 39 and is there bent at right angles to extend across the top of the scribing pin 34 as shown at 41. The extreme outer end of the handle 40 is bent downwardly and inwardly toward the opposite end of the body 29 as shown at 42. The lever 40 will normally bear upon the head 38 of the scribing pin 34 but the spring 36 is preferably of sufficient strength to hold the pin upwardly so that its point 35 will not project into the bore 30. The end of the handle 40 adjacent the pivot pin 39 is provided with a projection or shoulder 43 which will contact with the adjacent end of the body 29 to prevent the handle 40 from being swung up sufficiently far to entirely release the scribing pin 34 from the bore 33. Pressure applied to the end 42 of handle 40 will, of course, move the pin 34 inwardly with respect to the body 29.

In the operation of this form of our device, the pipe P to be marked is inserted in the bore 30 of the body 29 with the scribing pin 34 in its outward position. The end of the pipe is moved against the internal shoulder 31 of the bore 30 and the lever 40 is then pressed inwardly and downwardly to force the point 35 of the pin 34 against the outer surface of the pipe. The scribing tool is then rotated with respect to the pipe or the pipe is rotated with respect to the scribing tool to cause an annular mark to be formed on the exterior of the pipe.

In the form of our invention shown in Figures 5 and 6, the scribing device comprises a body 50 having its lower portion bifurcated to form two arms 51 which will partially embrace the pipe to be marked. One of the arms 51 of the body 50 is preferably provided with a squared or keyed bore 52 extending longitudinally of the body. A rod 53 of a cross section corresponding to the shape of the bore 52 is fitted in the bore, the extreme outer end of the rod 53 having an abutment plate 54 fixed thereto. The rod 53 thereby forms an extensible part of the body 50.

One or more surfaces of the rod 53 may be provided with graduated markings, as shown in Figure 5, and in order to permit the rod 53 to be held in positions corresponding to the graduations, one surface of the arm is provided with longitudinally spaced indentations 55 in which a ball 56 mounted in a bore in the body 50 will seat. The ball 56 is held inwardly by a coil spring 57, the outer end of the coil spring bearing against a set screw 58.

The body 50 includes a boss 60 provided with a bore 61 extending therethrough, the inner end of the bore 61 terminating at the apex of the angle formed by the bifurcated arms 51. It will be noted that the inner end of the bore 61 is of reduced diameter to form a shoulder 62. A scribing element or pin 63 is mounted in the bore 61, the scribing pin being provided with an annular shoulder 64. A coil spring 65 surrounds the pin 63 above the shoulder 64, the upper end of the spring bearing against the collar 66 threaded in the upper end of the bore 61. The extreme outer end of the scribing pin 63 has a head or thumb piece 67 fixed thereto.

The scribing pin 63 is provided adjacent its upper end with a transverse pin 68 of relatively small diameter, which moves in a longitudinal slot or key-way 69 in the collar 66. The slot 69 opens to the upper surface of the collar 66, but the lower end of the slot is closed. By this arrangement, the transverse pin 68 may be moved upwardly and out of the slot 69 so that it may be turned to bear upon the upper surface of the collar 66. With the transverse pin in this position, the point of the scribing pin 63 will be out of marking position.

In the operation of the device of Figures 5 and 6, the rod 53 may be moved with respect to the body 50 to position the abutment plate 54 at the proper distance from the scribing element or pin 63. The graduations provided on the rod 53 preferably indicate pipe sizes and are so arranged that when the face 70 of the body 50 is positioned at the mark indicating the size of the pipe being marked, the inner face of the abutment 54 will be spaced from the scribing pin 63 a distance corresponding to the distance between the annular shoulder and end of a pipe fitting of the size to receive that pipe.

The device having been set in this manner, the body 50 may be placed against the exterior surface of a pipe P adjacent the end thereof to partially embrace the same and with the abutment plate 54 contacting against the end of the pipe. The scribing pin 63 may then be permitted to move into contact with the exterior of the pipe by the action of the spring 65 and the device can then be rotated about the pipe to describe a circumferential mark about the same.

As indicated in Figure 6, the scribing tool may be used for marking pipe of a wide size range.

It will be observed that by the use of any one of the three forms of our device described in the present application, a circumferential mark or circumferentially spaced marks may be formed about pipe or other articles to indicate the depth to which the pipe must be inserted in a pipe fitting of the presoldered type to cause the inner end of the pipe to abut against the internal shoulder of the pipe fitting. Each of the forms of our invention will accurately mark a section of pipe or other article, due to the fact that each form of the tool may be readily longitudinally aligned with the pipe or other article to be marked.

It will be understood that the invention is not limited to the details of construction shown in the drawing and described in the specification and that the examples of the use of the various forms of the device which have been given do not include all of the uses of which the device is capable; also, that the phraseology employed in the specification is for the purpose of description and not of limitation.

We claim:—

1. A scribing tool comprising a cylindrical body adapted to receive an article to be marked, said body having an inwardly extending annular abutment at one end thereof and a scribing element arranged in said body.

2. A scribing tool comprising a body portion having an abutment at one end thereof against which an article to be marked may be positioned, a scribing element carried by said body and arranged for radial movement therein, means to normally hold the scribing element outwardly with respect to said body, and means to move said scribing element inwardly with respect to said body.

3. A scribing tool comprising a body portion having an abutment at one end thereof against which an article to be marked may be positioned, a scribing element carried by said body and arranged for radial movement therein, means to normally hold the scribing element outwardly with respect to said body, and a lever pivoted to said body and adapted to engage said scribing element to move the latter inwardly with respect to the body.

4. A scribing tool comprising a cylindrical body having an inwardly projecting annular shoulder at one end thereof against which an article to be marked may be positioned, a scribing element carried by said body and arranged for radial movement therein, means to normally hold the scribing element outwardly with respect to said body, and means to move said scribing element inwardly with respect to said body.

5. A scribing tool comprising a body portion having an abutment at one end thereof against which an article to be marked may be positioned, a scribing element carried by said body and arranged for radial movement therein, means to normally hold the scribing element outwardly with respect to said body, a lever pivoted to said body and contacting with said scribing element, said lever being adapted to be moved inwardly with respect to the body to move the scribing element inwardly, and cooperating means on said lever and body to limit the outward movement of the lever.

ROBERT H. MUELLER.
WARD M. ROBINSON.